United States Patent
Lee

(10) Patent No.: US 9,195,357 B2
(45) Date of Patent: Nov. 24, 2015

(54) SYSTEM FOR PROVIDING A USER INTERFACE FOR USE BY PORTABLE AND OTHER DEVICES

(71) Applicant: Samsung Electronics Co., Ltd., Gyeonggi-do (KR)

(72) Inventor: Joo-Hoon Lee, Gyeonggi-do (KR)

(73) Assignee: Samsung Electronics Co., Ltd., Samsung-ro, Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 14/026,404

(22) Filed: Sep. 13, 2013

(65) Prior Publication Data

US 2014/0085259 A1    Mar. 27, 2014

(30) Foreign Application Priority Data

Sep. 25, 2012    (KR) .................. 10-2012-0106793

(51) Int. Cl.
*G06F 3/044*    (2006.01)
*G06F 3/0488*   (2013.01)

(52) U.S. Cl.
CPC .............. *G06F 3/044* (2013.01); *G06F 3/0488* (2013.01); *G06F 3/04883* (2013.01); *G06F 2203/04808* (2013.01)

(58) Field of Classification Search
CPC .............. G06F 3/0488; G06F 3/016; G06F 2203/04108; G06F 3/0412; G06F 2203/04809; G06F 3/017; G06F 3/03545; G06F 3/0487; G06F 17/217; G06F 17/241; G06F 17/242; G06F 17/276; G06F 3/0416; G06F 3/04883
USPC .................. 345/156, 173–179, 661, 676; 178/18.01–18.09; 715/200; 463/37–38
See application file for complete search history.

(56) References Cited

U.S. PATENT DOCUMENTS

| 7,847,789 B2 | 12/2010 | Kolmykov-Zotov et al. |
| 2010/0117961 A1* | 5/2010 | Westerman ............... 345/163 |
| 2011/0291944 A1* | 12/2011 | Simmons et al. ............ 345/173 |
| 2012/0262407 A1* | 10/2012 | Hinckley et al. ............. 345/173 |

* cited by examiner

*Primary Examiner* — Md Saiful A Siddiqui
(74) *Attorney, Agent, or Firm* — Cha & Reiter, LLC.

(57) ABSTRACT

A method of processing a touch input of a portable terminal includes detecting a hover input, detecting a finger input while receiving the hover input, calculating a distance between positions of the hover input and the finger input, comparing the calculated distance with a predetermined threshold and ignoring or processing the finger input according to a result of the comparison.

7 Claims, 9 Drawing Sheets

SYSTEM FOR PROVIDING A USER INTERFACE FOR USE BY PORTABLE AND OTHER DEVICES

CROSS RELATED APPLICATION

This application claims the priority under 35 U.S.C. §119(a) from Korean Application Serial No. 10-2012-0106793, which was filed in the Korean Intellectual Property Office on Sep. 25, 2012, the entire content of which is hereby incorporated by reference.

BACKGROUND

1. Field of the Invention

The present disclosure relates to a user interface of a portable or other processing device such as a phone, notebook or computer, for processing input commands by finger, stylus (e.g. a stylus) and other devices via a touch screen.

2. Description of the Related Art

A portable device (a mobile terminal such as a phone, notebook, computer, and watch for example) typically includes a touch screen for receiving user input. A touch screen is used to distinguishably detect a finger input or the like and a stylus (stylus) input. The touch screen typically prioritizes a stylus input so that when there is a stylus input, the touch screen ignores a finger input to prevent malfunction associated with an inadvertent palm touch. However, where a user performs a finger touch while grasping a stylus, since a recognition distance of a stylus is relatively large, the finger touch is sometimes ignored, which may be recognized as a malfunction of the touch screen and cause problems. A system according to invention principles addresses this deficiency and related problems.

SUMMARY

A user interface system according to invention principles supports processing concurrent finger input and the stylus input commands in accordance with an intention of the user. The system detects a hover input command, detects a finger input command concurrently with the hover input command, calculates a distance between positions of the hover input command and finger input command, compares the calculated distance with a predetermined threshold and at least one of, ignores and processes the finger input command in response to a result of the comparison.

A portable terminal includes a machine-readable storage medium including a program executable by a processor for processing a touch input command. The portable terminal comprises a touch screen that displays input data and detects a hover input command and a finger input command. A controller calculates a distance between positions of the hover input command and the finger input command when the finger input is detected concurrently with the hover input command, compares the calculated distance with a predetermined threshold and ignores or processes the finger input command in response to a result of the comparison.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

The present invention may have various modifications and embodiments and thus will be described with reference to specific embodiments in detail. However, the present invention is not limited to the specific embodiments but should be construed as including all modifications, equivalents, and substitutes within the spirit and scope of the present invention.

While terms including ordinal numbers, such as "first" and "second," etc., may be used to describe various components, such components are not limited by the above terms. The above terms are used only to distinguish one component from another. For example, a first component may be referred to as a second component without departing from the scope of the present invention, and likewise a second component may be referred to as a first component. The term of and/or encompasses a combination of plural items or any one of the plural items.

The terms used herein are merely used to describe specific embodiments, and are not intended to limit the present invention. An expression used in the singular encompasses the expression of the plural, unless it has a clearly different meaning in the context. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. No claim element herein is to be construed under the provisions of 35 U.S.C. 112, sixth paragraph, unless the element is expressly recited using the phrase "means for". A stylus as used herein comprises a pointed instrument used as an input device on a touch screen or pressure-sensitive screen and may comprise a pen, writing instrument, or other hand held pointing instrument.

Figure 1:
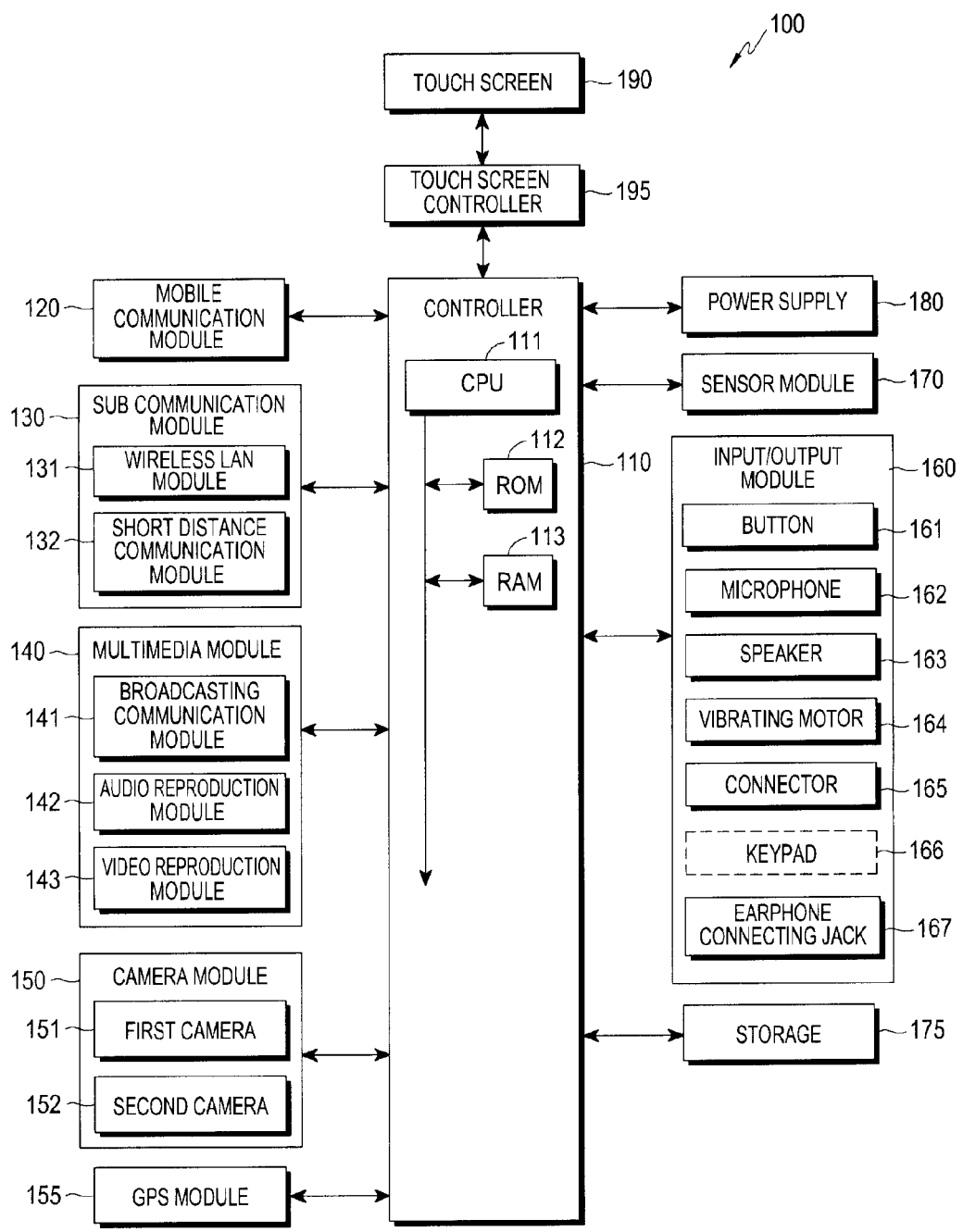
FIG. 1 is a block diagram schematically illustrating a portable terminal according to invention principles.
Figure 2:
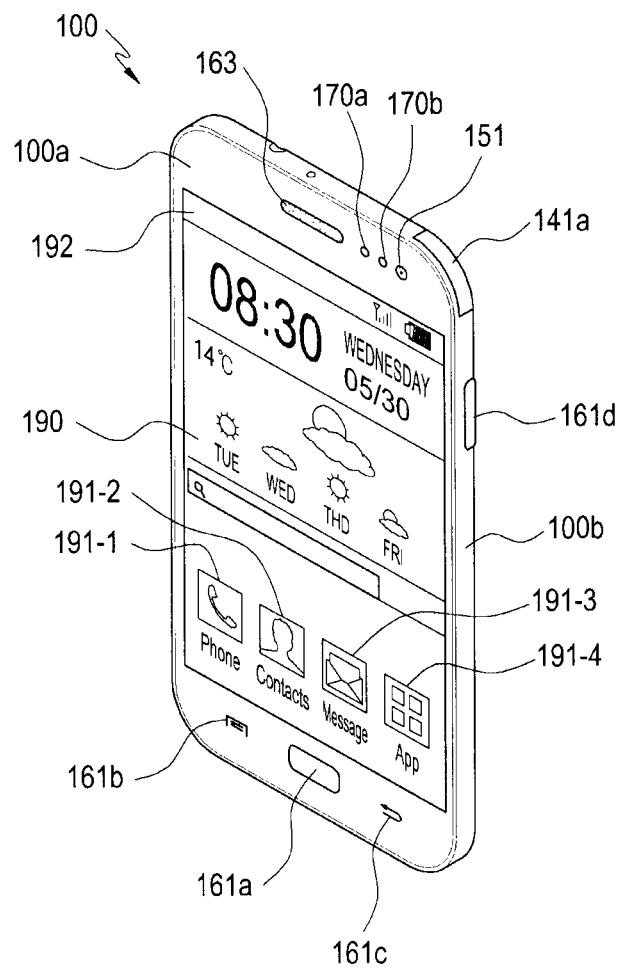
FIG. 2 is a front perspective view of a portable terminal according to invention principles.
Figure 3:
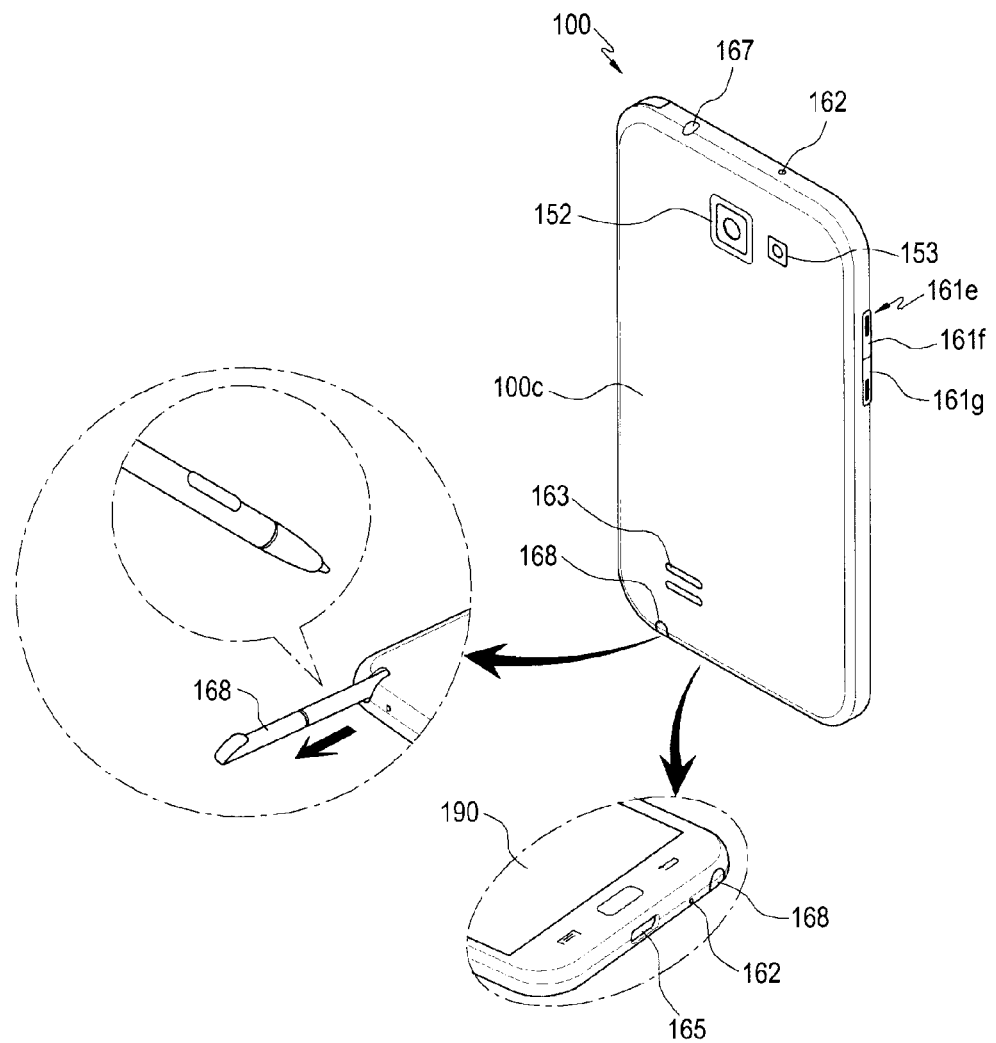
FIG. 3 is a rear perspective view of a portable terminal according to invention principles.

FIG. 1 shows a block diagram schematically illustrating a portable terminal according to an embodiment of the present invention, FIG. 2 is a front perspective view of a portable terminal according to an embodiment of the present invention, and FIG. 3 is a rear perspective view of a portable terminal according to an embodiment of the present invention.

Referring to FIG. 1, a portable terminal 100 may be connected with an external device (not shown) by using an external device connector such as a sub communication module 130, a connector 165, and an earphone connecting jack 167. The external device includes various devices attached to or detached from the portable terminal 100 through a cable, such as an earphone, an external speaker, a Universal Serial Bus (USB) memory, a charger, a cradle/dock, a DMB (Digital Multimedia Broadcasting) antenna, a mobile payment related device, a health management device (blood sugar tester, for example), a game machine, a car navigation device, for example. Further, the external device includes a Bluetooth communication device, a short distance communication device such as a Near Field Communication (NFC) device, a WiFi Direct communication device, and a wireless Access Point (AC) which may be wirelessly connected. In addition, the external device may include another device, a mobile phone, a smart phone, a tablet PC, a desktop PC, and a server.

The portable terminal 100 may comprise a smart phone, a mobile phone, a game machine, a TV, a display device, a head unit for a vehicle, a notebook, a laptop, a tablet PC, a Personal Media Player (PMP), a Personal Digital Assistant (PDA) or a watch, for example. The portable terminal 100 may be implemented as a pocket size portable mobile terminal having a wireless communication function.

The portable terminal 100 includes a touch screen 190 and a touch screen controller 195. Further, the portable terminal 100 includes a controller 110, a mobile communication module 120, a sub communication module 130, a multimedia module 140, a camera module 150, a GPS module 155, an input/output module 160, a sensor module 170, a storage unit 175, and a power supplier 180. The sub communication module 130 includes at least one of a wireless LAN module 131 and a short distance communication module 132, and the multimedia module 140 includes at least one of a broadcasting communication module 141, an audio reproduction module 142, and a video reproduction module 143. The camera module 150 includes at least one of a first camera 151 and a second camera 152. The input/output module 160 includes at least one of a button 161, a microphone 162, a speaker 163, a vibration motor 164, a connector 165, a keypad 166, and an earphone connecting jack 167.

The controller 110 includes a CPU 111, a ROM 112 storing a control program for controlling the portable terminal 100, and a RAM 113 used as a storage area for storing a signal or data input from the outside of the apparatus 100 or for work performed in the portable terminal 100. The CPU 111 includes a single core, a dual core, a triple core, a quad core or comprises another architecture. The CPU 111, the ROM 112, and the RAM 113 may be mutually connected to each other through an internal bus. The controller 110 controls the mobile communication module 120, the sub communication module 130, the multimedia module 140, the camera module 150, the GPS module 155, the input/output module 160, the sensor module 170, the storage unit 175, the power supplier 180, the touch screen 190, and the touch screen controller 195.

The mobile communication module 120, the sub communication module 130, and the broadcasting communication module 141 of the multimedia module 140 may be collectively called a communication unit, and the communication unit is provided for a direct connection with an external device or a connection through a network and may be a wired or wireless communication unit. The communication unit can transmit data to the controller 110, the storage unit 175, and the camera module 150 in a wired manner or wirelessly, or receive data from an external communication line or the air and transmit the data to the controller 110 or store the data in the storage unit 175.

The mobile communication module 120 enables the portable terminal 100 to be connected with the external device through mobile communication by using one antenna or a plurality of antennas according to a control of the controller 110. The mobile communication module 120 transmits or receives a wireless signal for exchanging, unidirectionally transmitting, or receiving data of voice phone communication, video phone communication, a Short Message Service (SMS), or a Multimedia Message Service (MMS) to/from a mobile phone (not shown), a smart phone (not shown), a tablet PC, or another device (not shown) having a phone number input into the apparatus 100.

The sub communication module 130 may include at least one of the wireless LAN module 131 and the short distance communication module 132. For example, the sub communication module 130 may include just the wireless LAN module 131, just the near field communication module 132, or both the wireless LAN module 131 and the near field communication module 132.

The wireless LAN module 131 may be Internet-connected according to a control of the controller 110 in a place where a wireless Access Point (AP) (not shown) is installed. The wireless LAN module 131 supports a wireless LAN standard (IEEE802.11x) of the Institute of Electrical and Electronics Engineers. The short distance communication module 132 wirelessly performs near field communication between the portable terminal 100 and an image forming apparatus (not shown) in response to control of the controller 110. A short distance communication method includes Bluetooth, Infrared Data Association (IrDA) communication, WiFi-Direct communication and Near Field Communication (NFC), for example.

The portable terminal 100 may include at least one of the mobile communication module 120, the wireless LAN module 131, and the short distance communication module 132. For example, the portable terminal 100 may include a combination of the mobile communication module 120, the wireless LAN module 131, and the short distance communication module 132.

The multimedia module 140 includes the broadcasting communication module 141, the audio reproduction module 142, or the video reproduction module 143. The broadcasting communication module 141 receives a broadcasting signal (for example, a TV broadcasting signal, a radio broadcasting signal, or a data broadcasting signal) and broadcasting supplemental information (for example, Electric Program Guide: EPG or Electric Service Guide: ESG) output from a broadcasting station through a broadcasting communication antenna (not shown) in response to control of the controller 110. The audio reproduction module 142 reproduces a digital audio file (for example, a file having a file extension of mp3, wma, ogg, or wav) stored or received in response to control of the controller 110. The video reproduction module 143 reproduces a digital video file (for example, a file having a file extension of mpeg, mpg, mp4, avi, mov, or mkv) stored or received in response to a control of the controller 110. The video reproduction module 143 reproduces the digital audio file.

The multimedia module 140 includes the audio reproduction module 142 or the video reproduction module 143 except for the broadcasting communication module 141. Further, the audio reproduction module 142 or the video reproduction module 143 of the multimedia module 140 may be included in the controller 110.

The camera module 150 includes at least one of the first camera 151 and the second camera 152 for photographing a still image or a video according to a control of the controller 110. Further, the first camera 151 or the second camera 152 includes an auxiliary light source (for example, a flash (not shown) providing light required for the photographing. The first camera 151 may be disposed on a front surface of the apparatus 100, and the second camera 152 may be disposed on a back surface of the apparatus 100. Alternatively, the first camera 151 and the second camera 152 may be closely located to each other (for example, an interval between the first camera 151 and the second camera 152 is larger than 1 cm and smaller than 8 cm) and acquire a three dimensional still image or a three dimensional video.

The cameras 151 and 152 include a lens system, an image sensor and a flash source, for example. The cameras 151 and 152 convert an optical signal input (or photographed) through the lens system to an image signal and output the converted image signal to the controller 110. The user acquires a video or a still image through the cameras 151 and 152. The lens system forms an image of a subject by converging a light incident from the outside. The lens system includes at least one lens and each lens may be a convex lens and an aspheric lens, for example. The lens system has symmetry with respect to an optical axis passing through the center thereof, and the optical axis is defined as a center axis. The image sensor detects the optical image formed by the external light incident through the lens system as an electrical image signal. The image sensor has a plurality of pixel units placed in an M×N matrix structure and includes a photodiode and a plurality of transistors. The pixel unit accumulates charges generated by the incident light, and a voltage derived from accumulated charges indicates luminance of incident light. In processing one image included in a still image or a video, the image signal output from the image sensor consists of a set of voltages (that is, pixel values) output from the pixel units and the image signal indicates one frame (that is, a still image). Further, a frame comprises M×N pixels. The image sensor includes a Charge-Coupled Device (CCD) image sensor, a Complementary Mental-Oxide Semiconductor (CMOS) image sensor, for example.

A driver drives the image sensor according to a control of the controller 110. The driver drives entire pixels of the image sensor or pixels in an area of interest comprising a subset of the entire pixels in response to a control signal received from the controller 110 and image data output from the pixels is output to the controller 110.

The controller 110 processes the image input from the cameras 151 and 152 or the image stored in the storage unit 175 as frames and outputs an image frame converted to be suitable for screen characteristics (size, picture quality, resolution, for example) of the touch screen 190.

The GPS module 155 receives radio waves from a plurality of GPS satellites (not shown) in Earth's orbit and calculate a position of the portable terminal 100 by using Time of Arrival from the GPS satellites to the portable terminal 100.

The input/output module 160 includes at least one of, the button 161, the microphone 162, the speaker 163, the vibration motor 164, the connector 165, and the keypad 166. The input/output module 160 except for the connector 165 is used for receiving a user input or informing the user of information. Other examples of the input/output module 160 are not limited thereto, but a mouse, a trackball, a joystick, or a cursor control such as cursor direction keys may be provided for information communication with the controller 110 and a control of a motion of the cursor on the touch screen 190.

The button 161 may be formed on a front surface 100a, a side surface 100b, or a back surface 100c (FIG. 3) of the portable terminal 100, and may include at least one of a power button 161d, volume buttons 161e having a volume increase button 161f and a volume decrease button 161g, a menu button 161b, a home button 161a, a back button 161c, and a search button.

The microphone 162 receives a voice or a sound to generate an electrical signal in response to a control of the controller 110.

The speaker 163 outputs sounds corresponding to various signals (for example, a wireless signal, a broadcasting signal, a digital audio file, a digital video file, taking a picture, for example) of the mobile communication module 120, the sub communication module 130, the multimedia module 140, or the camera module 150 to the outside of the portable terminal 100, in response to a control of the controller 110. The speaker 163 outputs a sound (for example, button tone corresponding to phone communication, ringing tone, and a voice of another user) corresponding to a function performed by the portable terminal 100. One speaker 163 or a plurality of speakers 163 may be formed on a suitable position or positions of the housing of the portable terminal 100.

The vibration motor 164 converts an electrical signal to a mechanical vibration in response to control of the controller 110. For example, when portable terminal 100 in a vibration mode receives voice or video phone communication from another device (not shown), a vibration motor is operated. One vibration motor 164 or a plurality of vibration motors 164 may be formed within the housing of the portable terminal 100. The vibration motor operates in accordance with a touch action of the user on the touch screen or successive touch motions or a gesture on the touch screen 190.

The connector 165 may be used as an interface for connecting the apparatus with an external device (not shown) or a power source (not shown). The portable terminal 100 transmits or receives data stored in the storage unit 175 of the apparatus 100 to or from an external device (not shown) through a wired cable connected to the connector 165 in response to control of the controller 110. The external device may be a docking station, and the data may be an input signal transmitted from an external input device, for example, a mouse or a keyboard. The portable terminal 100 receives power from the power source through the wired cable connected to the connector 165 and charges a battery (not shown) using the power source.

The keypad 166 receives a key input from the user for the control of the portable terminal 100. The keypad 166 includes a physical keypad (not shown) formed in the portable terminal 100 or a virtual keypad (not shown) displayed on the display unit 190. The physical keypad (not shown) formed in the portable terminal 100 may be excluded in response to a capability or structure of the portable terminal 100.

An earphone (not shown) is inserted into the earphone connecting jack 167 to be connected with portable terminal 100.

The sensor module 170 includes at least one sensor for detecting a state (position, direction and motion, for example) of the portable terminal 100. For example, the sensor module 170 includes at least one of a proximity sensor for detecting whether a user approaches the portable terminal 100, an illumination sensor (not shown) for detecting an amount of ambient light of the portable terminal 100, a motion/direction sensor for detecting motions of the portable terminal 100 (for example, rotation, acceleration, retardation, vibration of the portable terminal 100), and an altimeter for measuring an atmospheric pressure to detect an altitude. Further, the motion/direction sensor may include an acceleration sensor, a geo-magnetic sensor (not shown) for detecting a point of the compass by using the Earth's magnetic field, a gravity sensor for detecting a gravity action direction, a gyro sensor, an impact sensor, a GPS and a compass sensor, for example. At least one sensor detects a state, generates a signal corresponding to the detection, and transmits the signal to the controller 110. The sensors of the sensor module 170 may be present or omitted from portable terminal 100.

The storage unit 175 stores a signal or data input/output in response to the operation of the communication module 120, the sub communication module 130, the multimedia module 140, the camera module 150, the GPS module 155, the input/output module 160, the sensor module 170, or the touch screen 190. The storage unit 175 stores a control program and applications for controlling the portable terminal 100 or the controller 110. The term "storage unit" is used to refer to a random data storage device such as the storage unit 175, the ROM 112 and the RAM 113 within the controller 110, or a memory card (for example, an SD card or a memory stick) installed in the portable terminal 100.

The storage unit 175 stores images for providing applications having various functions such as navigation, a video phone call, a game for example and Graphical User Interfaces (GUIs) related to the applications, databases related to a method of providing user information, a document, and the user interface, data, background images (menu screen, standby screen for example) required for driving the portable terminal 100, operating programs, or images acquired by the camera. The storage unit 175 is a machine-readable storage medium (readable by a computer, for example), and a machine-readable medium is defined herein as a medium for providing data to a machine to perform a specific function. The storage unit 175 includes a non-volatile medium and a volatile medium. Such media or of a type enabling commands transmitted from, or stored by, the media are detectable by a physical device in a machine reading the commands.

The machine-readable medium includes at least one of a floppy disk, a flexible disk, a hard disk, a magnetic tape, a Compact Disk Read-Only Memory (CD-ROM), an optical disk, a punch card, a paper tape, a Read-Only Memory (RAM), a Programmable ROM (PROM), an Erasable PROM (EPROM), and a flash-EPROM, for example.

The power supplier 180 supplies power to a battery or a plurality of batteries (not shown) in the portable terminal 100 in response to a control of the controller 110. The battery or the plurality of batteries (not shown) supply power to the portable terminal 100. Further, the power supply 180 provides power input from an external power source (not shown) to the portable terminal 100 through a wired cable connected to the connector 165. In addition, the power supply 180 supplies power wirelessly input from an external power source to the portable terminal 100 through a wireless charging unit.

The touch screen 190 provides user interface display images corresponding to various services (for example, phone communication, data transmission, broadcasting, and photography) to the user. The touch screen 190 transmits an analog signal corresponding to at least one touch input to the user interface via the touch screen controller 195. The touch screen 190 receives at least one touch through a touch system (for example, a finger or a stylus). Further, the touch screen 190 can receive successive touch motions or a gesture as input commands. The touch screen 190 transmits an analog (or digital) signal corresponding to the successive motions of the input touch to the touch screen controller 195.

Further, a stylus 168 may be formed in a lower side surface of the portable terminal 100. The stylus 168 may be stored while being inserted into the portable terminal and may be withdrawn and removed from the portable terminal 100 when being used. In addition, a stylus attachment/detachment switch (not shown) operating in accordance with attachment and detachment of the stylus 168 is located in one area with in the portable terminal into which the stylus 168 is inserted and provides a signal corresponding to the attachment and detachment of the stylus 168 to the controller 110.

Furthermore, a touch is not limited to be between the touch screen 190 and a touch element (a finger or a stylus) and may include a non-contact (for example, a case where a physical distance interval between the touch screen 190 and the touch element is 1 cm or shorter). A detection threshold interval of the touch screen 190 may be changed in response to configuration information or structure of the portable terminal 100. Particularly, the touch screen 190 changes an output value in response to an interval between the touch screen 190 and the touch element such that a touch event between the touch screen 190 and the touch element and an input (for example, hovering) event in a non-contact state are distinguishably detected. That is, the touch screen 190 is implemented to process a value (for example, a current value, a voltage value, a capacitance value) detected by the touch event in a different manner than a value detected by the hovering event.

The touch screen controller 195 converts an analog signal received from the touch screen 190 to a digital signal (for example, (X,Y) coordinates and a detection value) and transmits the converted digital signal to the controller 110. The controller 110 controls the touch screen 190 using the digital signal received from the touch screen controller 195. For example, the controller 110 allows a short-cut icon displayed on the touch screen 190 to be executed in response to a touch event or a hovering event. In one embodiment, the touch screen controller 195 is included in the controller 110 or the touch screen 190.

Further, the touch screen controller 195 calculates a distance between the touch element and the touch screen 190 based on a value output from the touch screen 190, and converts the calculated distance value to a digital signal (for example, a Z coordinate) and provides the converted digital signal to the controller 110.

Moreover, the touch screen controller 190 determines whether the user input element (e.g., a stylus) and the touch screen 190 contact each other based on the value output from the touch screen 190, converts the value indicating whether the user input element and the touch screen 190 contact each other to a digital signal, and provides the digital signal to the controller 110. In addition, in order to distinguishably detect an input by a finger and an input by a stylus, the touch screen 190 includes at least two touch screen panels which detect the input by the finger and the input by the stylus, respectively. The at least two touch screen panels provide different output values to the touch screen controller 195, and the touch screen controller 195 recognizes and distinguishes the values input from the at least two touch screen panels to determine whether the input from the touch screen 190 is the input by the finger or the stylus. For example, the touch screen 190 in an embodiment has a structure in which one touch screen panel is a capacitive type and another touch screen panel is an Electromagnetic Resonance (EMR) type used in combination. Further, as described above, the touch screen may include touch keys such as the menu button 161*b*, the back button 161c and accordingly, a finger input includes a touch input on the touch key as well as a finger input on the touch screen 190.

Referring to FIG. 2, the touch screen 190 is disposed on a center of the front surface 100a of the portable terminal 100. The touch screen 190 has a large size to occupy most of the front surface 100a of the portable terminal 100. FIG. 2 shows an example where a main home screen is displayed on the touch screen 190 and is a first screen displayed on the touch screen 190 when power of the portable terminal 100 is turned on. Further, when the portable terminal 100 has different home screens of several pages, the main home screen may be a first home screen of the home screens of several pages. Short-cut icons 191-1, 191-2, and 191-3 are used for executing frequently used applications and a main menu icon 191-4, time, weather for example may be displayed on the home screen. Further, a status bar 192 displays the status of the portable terminal 100 such as a battery charging status, a received signal intensity, and a current time.

The touch keys such as the home button 161a, the menu button 161b, the back button 161c for example, may alternatively comprise mechanical keys, or a combination thereof may be formed below the touch screen 190. Further, the touch keys may be a part of the touch screen 190. When the home button 161a is selected, the touch screen 190 displays a main home screen. For example, when the home button 161a is pressed in a state where a menu screen or an application screen is displayed on the touch screen 190, the main home screen is displayed on the touch screen 190. That is, when the home button 161a is touched while applications are executed on the touch screen 190, the main home screen shown in FIG. 2 may be displayed on the touch screen 190. In addition, the home button 161a may be used to display recently used applications or a task manager on the touch screen 190. The menu button 161b provides a connection menu which can be used on the touch screen 190. The connection menu includes a widget addition menu, a background changing menu, a search menu, an editing menu or an environment setup menu for example. The back button 161c can be used for displaying the screen which was executed just before the currently executed screen or for terminating the most recently used application.

The first camera 151, the illumination sensor 170a, and the proximity sensor 170b may be disposed on edges of the front surface 100a of the portable terminal 100. The second camera 152, the flash 153, and the speaker 163 may be disposed on a rear surface 100c of the portable terminal 100. For example, the power button 161d and the volume buttons 161e may be disposed on left and right side surfaces of the portable terminal 100, and a terrestrial DMB antenna 141a for broadcasting reception and the earphone connecting jack 167 may be disposed on an upper side surface. Further, one or a plurality of microphones 162 may be disposed on upper and lower side surfaces 100b of the portable terminal 100. The DMB antenna 141a may be fixed to the portable terminal 100 or may be formed to be detachable from the portable terminal 100. An earphone may be inserted into the earphone connecting jack 167. Further, the connector 165 is formed in a lower side surface of the portable terminal 100. A plurality of electrodes are formed in the connector 165 and may be connected with an external device through a wired cable.

Figure 4:
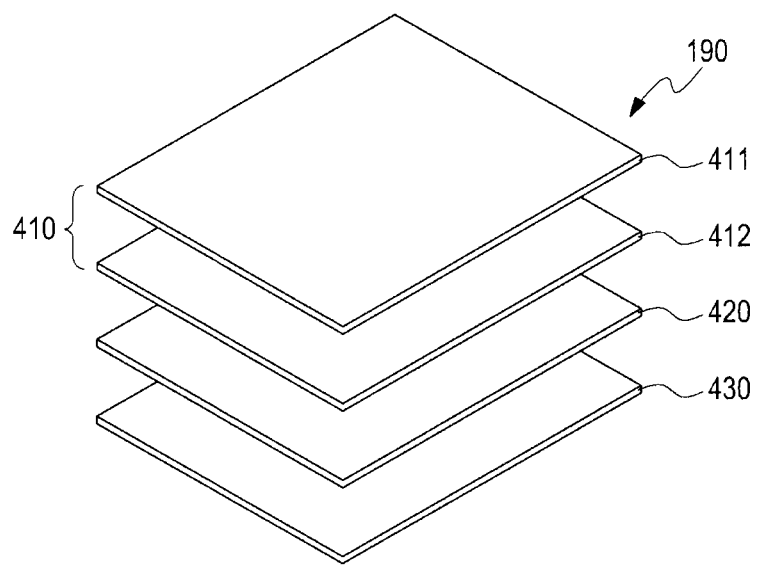
FIG. 4 is a perspective view separately showing main components of a touch screen according to invention principles.

FIG. 4 is a perspective view separately illustrating main components of the touch screen. As illustrated in FIG. 4, the touch screen 190 has a configuration in which a first touch panel 410 for detecting a finger input from a top to a bottom, a display unit 420 for a screen display, and a second touch panel 430 for detecting a stylus input are stacked close to each other or sequentially stacked with an interval therebetween. The display unit 420 has a plurality of pixels and displays an image through the pixels. A Liquid Crystal Display (LCD), an Organic Light Emitting Diode (OLED), an LED for example may be used for the display unit 420.

The first touch panel 410 includes a window 411 exposed through a front surface of the portable terminal 100 and a sensor layer 412 for detecting information (position, intensity for example) of a finger input, and the sensor layer 412 is deposited on a separate substrate over the window 411 or directly deposited on the window 411. The first touch panel 410 may be constructed to provide the touch keys such as the menu button 161b, the back button 161c for example located below the screen exposed to the user. An upper surface of the window 411 is included in at least a part of the front surface of the touch screen 190 exposed to the outside. The window 411 may be formed with a transparent insulating material for visible light. Examples of the insulating material may include resin such as polyimide and polyethylene terephthalate or plastic.

A hard coating layer having high hardness is deposited on the upper surface of the window 411 to prevent a scratch and to improve the hardness and provide an antiglare function. For example, the hard coating layer may be formed with a material generated by adding light scattering agents to general hard coating agents. The sensor layer 412 includes a sensor for detecting a position when a passive user input means contacts a surface of the window 411 and has preset patterns for the detection. The sensor layer 412 may have various patterns such as a linear grid pattern, a diamond pattern for example, and the linear grid pattern is described as an example in the present embodiment. The sensor layer 412 may be deposited on a lower surface of the window 411 or a lower end (or lower surface) may be attached to an upper end (upper surface) of the display unit 420.

Figure 5:
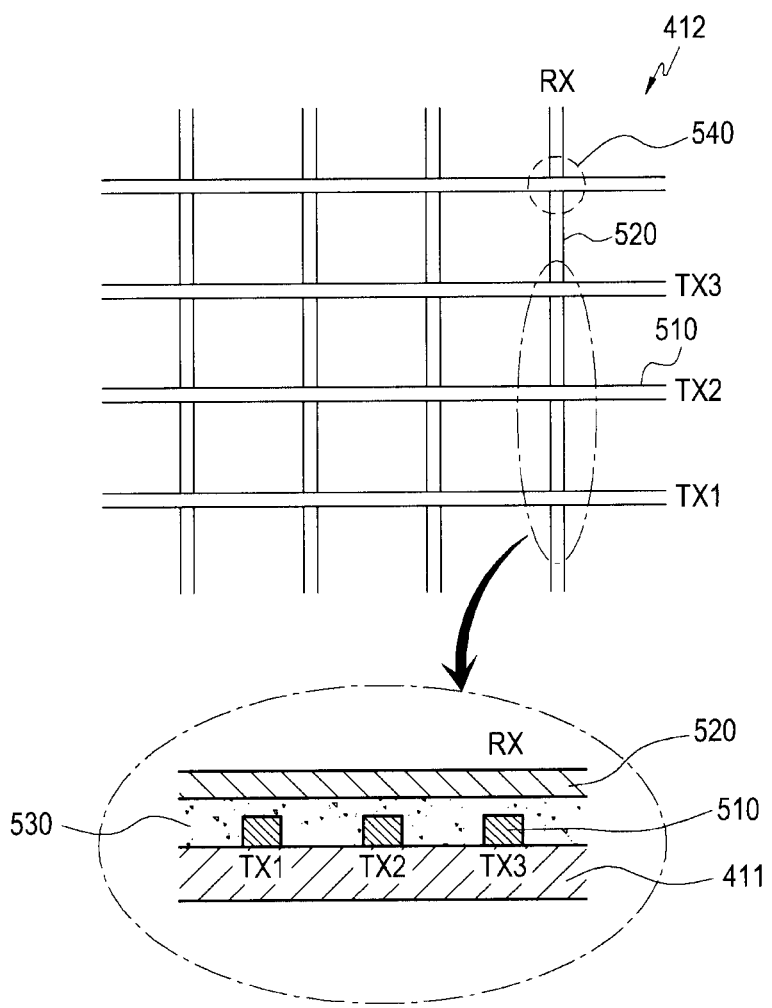
FIG. 5 is a diagram illustrating an example of a pattern of a sensor layer according to invention principles.

FIG. 5 shows a diagram illustrating an example of a pattern of a sensor layer. The sensor layer 412 includes first electrode lines 510 and second electrode lines 520. A cross-sectional view shown in a lower part of FIG. 5 illustrates the first electrode lines 510 TX1, TX2, and TX3 and the second electrode lines 520 RX. Each of the first electrode lines 510 extends in a first direction (for example, an x axis or a horizontal direction) and are disposed with an equal interval or different intervals in a second direction (for example, a y axis or a vertical direction) orthogonally crossing the first direction. Each of the second electrode lines 520 extends in the second direction orthogonally crossing the first direction and are disposed with an equal interval or different intervals in the first direction.

An insulating layer 530 is disposed between the first electrode lines 510 and the second electrode lines 520 to electrically insulate the first electrode lines 510 and the second electrode lines 520. An insulating dielectric material such as SiO2 for example may be used as a material of the insulating layer 530. The sensor layer 412 is formed with a transparent conductive material for the visible light, and an example of the conductive material may include an organic material containing carbon such as carbon nanotube (CNT) or graphene. The sensor layer 412 may be formed through a process of forming a conductive thin film by a vacuum deposition process and then patterning the conductive thin film by a lithography process. An example of the vacuum deposition process may include E-beam, Sputtering, for example.

In order to perform a sensor function, a scan signal having a predetermined waveform is applied to the sensor layer 412. When a first user input means contacts the surface of the window 411, a detection signal waveform is changed due to capacitance between the sensor layer 412 and the first user input means. The controller 110 analyzes the detection signal and detects whether the first user input means contacts the surface of the window 411 and determines a contact position in the grid of first and second electrode lines 510 and 520. For example, when the first user input means contacts the touch screen 190, capacitance of a corresponding sensing point 540 increases. The controller 110 detects generation of a finger touch event based on a detection signal having a peak value equal to or larger than a threshold (or a minimum value equal to or smaller than the threshold) and also detects a finger input position. The threshold is a value by which a noise and a normal signal can be distinguished. The threshold is experimentally set, and may be set to have, for example, a voltage equal to or larger than 0 V or a capacitance value equal to or larger than 0 pf. Meanwhile, a finger is an example of the first user input means, and the first user input means has no limitation as long as it is a means which provides capacitance between the sensor layer 412 and the first user input means. Such means are collectively called passive or first user input means.

In order to perform the sensor function, voltages (that is, scan signals) having a predetermined waveform from the touch screen controller 195 are sequentially applied to the first electrode lines 510, and the second electrode lines 520 and output detection signals in response to the scan signals are provided to the touch screen controller 195. Points where the first and second electrode lines 510 and 520 cross are the sensing points 540, and the sensing points 540 are disposed in a matrix structure in the present embodiment. That is, a finger input position is determined as one of positions of the sensing points 540. When the first user input means contacts the surface of the window 411, capacitance of the sensing points 540 is changed due to the capacitance between the sensor layer 412 and the first user input means. Due to the change in the capacitance, voltage waveforms of the detection signals output from the second electrode lines 520 are changed and an input position and/or an input intensity of the first user input means is detected in response to the detected changed voltage waveforms.

Figure 6:
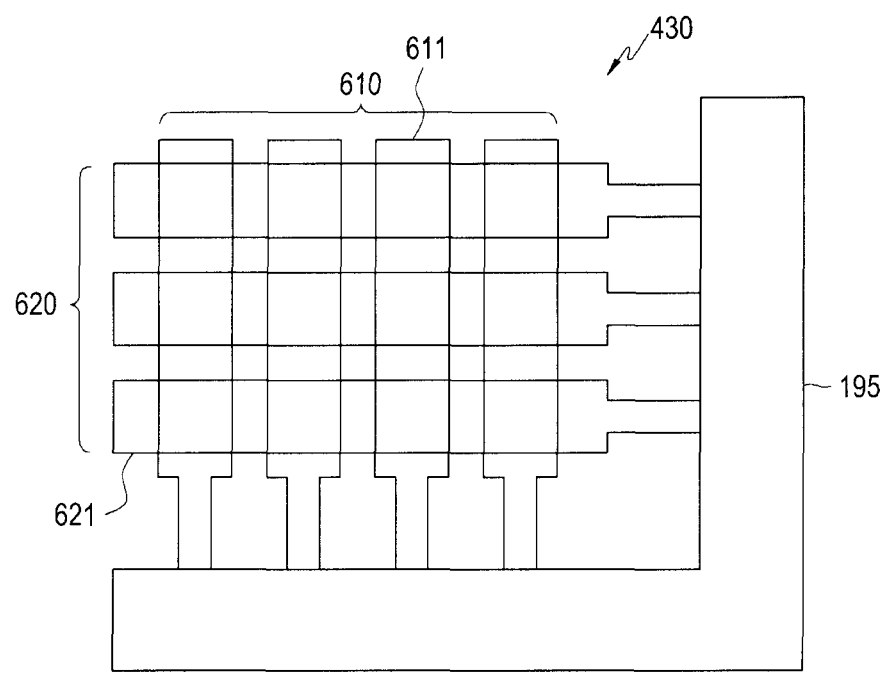
FIG. 6 is a diagram for describing a second touch panel according to invention principles.

FIG. 6 shows a diagram of the second touch panel 430 comprising a touch panel of the Electromagnetic Resonance (EMR) type and includes first and second loop units 610 and 620. The second touch panel 430 is operated by a control of the touch screen controller 195 and outputs detected signals to the touch screen controller 195. The first loop unit 610 includes a plurality of first loops 611 and the second loop unit 620 includes a plurality of second loops 621.

The first loop unit 610 and the second loop unit 620 may be disposed to be orthogonal to each other. The first loop unit 610 extends relatively long in a y axis in comparison with an x axis, and accordingly, is used to detect an x axis coordinate of a stylus input position. The second loop unit 620 extends relatively long in an x axis in comparison with a y axis, and accordingly, is used to detect a y axis coordinate of a stylus input position.

Each of the first and second loops 611 and 621 output a first signal of a fixed first frequency input in a form of an electromagnetic wave from the touch screen controller 195. Further, the first and second loops 611 and 621 detect a second signal of a second frequency output in a form of an electromagnetic wave from a stylus corresponding to an active second user input means, and outputs the detected second signal to the touch screen controller 195. The first frequency and the second frequency may be different from each other. The stylus located adjacent to the second touch panel 430 receives a first signal output in a form of an electromagnetic wave from the second touch panel 430 and in response generates a second or third signal in a form of an electromagnetic wave according to operation of a resonance circuit within the stylus. The stylus resonant circuit emits the generated second or third signal which is detected by coils 610 and 620.

When the stylus does not contact the touch screen 190, the stylus outputs a second signal of a fixed frequency. When the stylus contacts the touch screen 190, the stylus outputs a third signal of a second or third frequency which changes in response to contact pressure. Alternatively, in one embodiment the stylus outputs a second signal of a fixed second frequency regardless of the contact between the stylus and the touch screen 190. The stylus may output a third signal of a fixed second frequency including data indicating whether the stylus contacts the touch screen 190. Further, the stylus is one embodiment, and other means can be used as a stylus if the means can output a second and/or third signals of the second and/or third frequency in response to an input of the first signal of the first frequency. The means may be collectively called the second user input means. The stylus includes a resonance circuit including a coil for detecting a position of the second touch panel 430 in the EMR type and a condenser.

Figure 7:
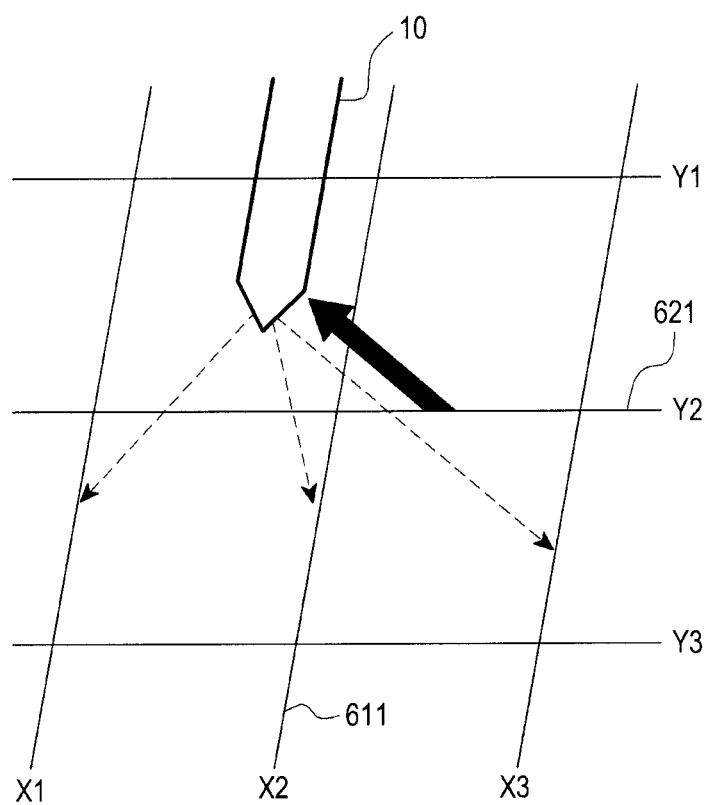
FIGS. 7 and 8 are diagrams for describing a method of detecting a stylus input position according to invention principles.
Figure 8:
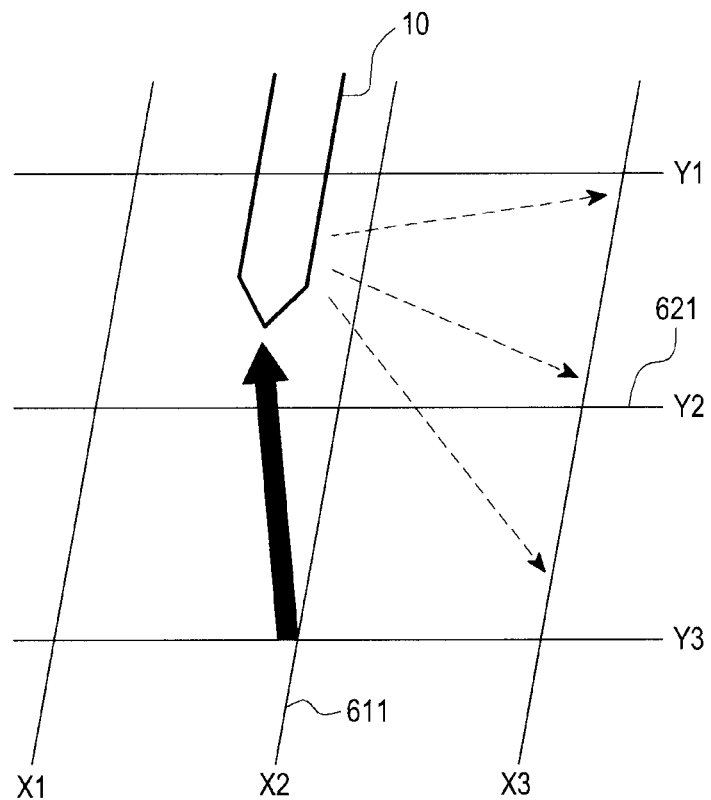

FIGS. 7 and 8 show diagrams illustrating detection of a stylus input position where each of the first and second loops 611 and 621 is indicated by one line. The second loop 621 (hereinafter, referred to as a Y2 loop) emits a first signal in a form of an electromagnetic wave, and stylus 10 in response to the first signal, generates and emits a second signal in a form of an electromagnetic wave. The first loops 611 (hereinafter, referred to as X1, X2, and X3 loops) sequentially detect the second signal. The touch screen controller 195 derives an x axis coordinate of a stylus position in response to a peak or minimum value of an output of multiple output values provided by loops 611 derived in response to the second signal. Specifically, controller 195 derives an x axis coordinate of a stylus position in response to comparison of the peak value with a first threshold and comparison of the minimum value with a second threshold. For example, a threshold may be set as a voltage equal to or larger than 0 V or an electrical current value equal to or larger than 0 A.

Referring to FIG. 8, the first loop 611 (eg, an X2 loop) emits a first signal in a form of an electromagnetic wave, and the stylus 10 generates and emits a second signal in a form of an electromagnetic wave in response to the first signal. The second loops 621 (hereinafter, referred to as Y1, Y2, and Y3 loops) sequentially detect the second signal. The touch screen controller 195 derives a y axis coordinate of a stylus input position in response to a peak or minimum value of an output of multiple output values provided by loops 621 derived in response to the second signal. Specifically, controller 195 derives a y axis coordinate of a stylus position in response to comparison of the peak value with a first threshold and comparison of the minimum value with a second threshold.

Figure 9:
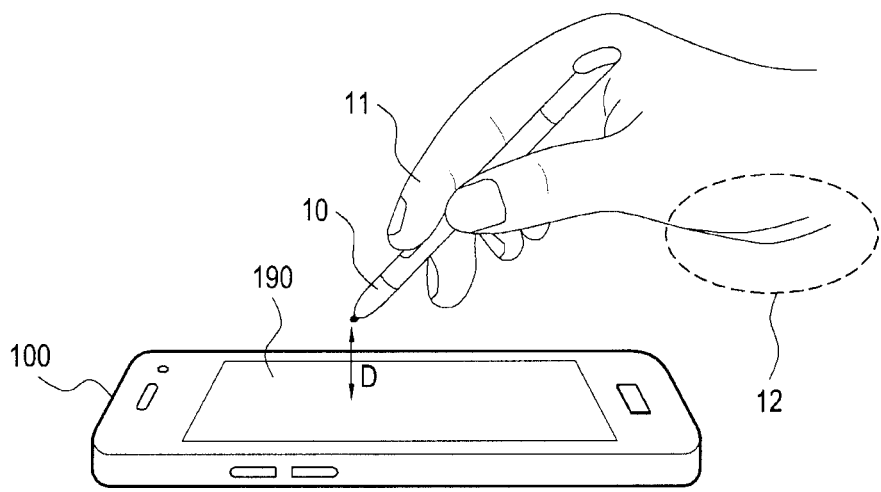
FIG. 9 is a diagram for describing a hovering input according to invention principles.

FIG. 9 is a diagram illustrating a hover input. An input recognition distance as used herein comprises a maximum distance between a user input means (stylus or finger) and the touch screen 190 within which the controller 110 or the touch screen controller 195 can detect and output an input coordinate. An input recognition distance of the second touch panel 430 is larger than an input recognition distance of the first touch panel 410. Since the first touch panel 410 has a relatively small input recognition distance (that is, the input recognition distance is about 0) Finger input touch detection by system 100 is limited to contact with the touch screen 190. The second touch panel 430 in contrast, detects a stylus hover input and a stylus touch (contact) input.

In response to a distance between the stylus 10 and the touch screen 190 being larger than 0 and ranges within the input recognition distance, the second touch panel 430 detects and outputs a second signal. In response to a distance between the stylus 10 and the touch screen 190 is 0, the second touch panel 430 detects and outputs a third signal. That is, the second touch panel 430 detects and outputs the second signal in response to a hover operation of a user, and detects and outputs a third signal in response to a touch operation of the user. For example, a stylus hover input and a stylus touch input is distinguished by existence or non-existence of pressure applied on the touch screen 190 by the stylus 10. When the pressure is 0, the second touch panel 430 outputs the second signal. When the pressure is larger than 0, the second touch panel 430 outputs the third signal.

When a user makes a finger input using a finger 11 in a state comprising grasping the stylus 10, the finger input may be ignored. Further, when the user makes a stylus input, a touch of a palm 12 may occur. The system distinguishes a finger input and a stylus input and an associated intention of the user. Inputs by parts of the body such as a finger, a palm for example are collectively called a finger input herein.

Figure 10:
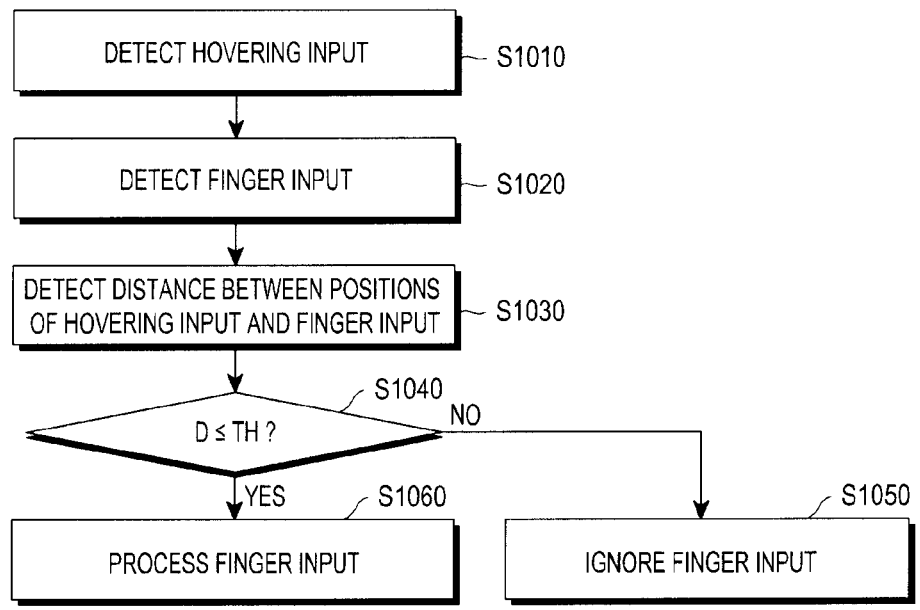
FIG. 10 is a flowchart illustrating a method of processing a multi-touch according to invention principles.

FIG. 10 shows a flowchart of a method of processing multiple touch inputs. In step S1010 a hover input is detected. When the stylus enters within the input recognition distance of the second touch panel 430 on the surface of the touch screen 190 of the portable terminal 100, the controller 110 detects a stylus hover input. That is, the controller 110 detects and recognizes a stylus hover event of a user in response to a detection value of the touch screen 190. Specifically, the second touch panel 430 outputs a first signal of a fixed first frequency in a form of an electromagnetic wave and detects a second signal of a fixed second frequency output in a form of an electromagnetic wave from the stylus. The controller 110 detects generation of the stylus hover event in response to the second signal having a peak value equal to or larger than a threshold and also detects a stylus input position and/or intensity.

In step S1020 a finger input is detected. When a user performs a finger touch while a stylus hover input is maintained, the controller 110 detects the finger input in response to a detection value of the touch screen 190. That is, the controller 110 detects the finger touch (or palm touch) event based on the detection value of the touch screen 190. Specifically, a scan signal is applied to the sensor layer 412 of the first touch panel 410 and the sensor layer 412 outputs a detection signal. The controller 110 detects generation of the finger touch event based on the detection signal having a peak value equal to or larger than a threshold and also detects a finger input position and/or intensity. In step S1030 controller 110 calculates a distance between a hover input position and a finger input position.

Figure 11A:
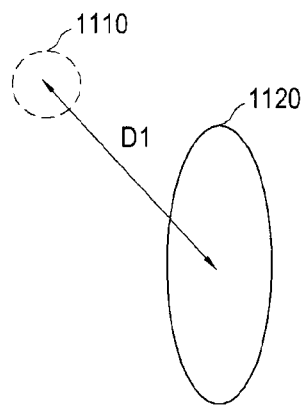
FIGS. 11A, 11B and 11C are diagrams for describing a process of calculating a distance between a hovering input position and a finger input position according to invention principles.
Figure 11B:
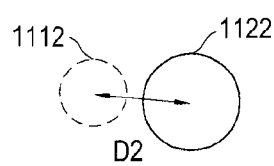
Figure 11C:
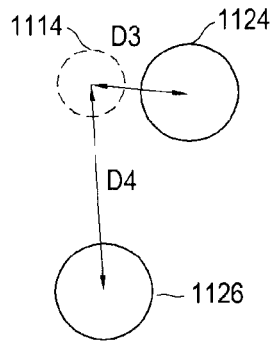

FIGS. 11A to 11C show diagrams for describing a process of calculating a distance between a hover input position and a finger input position. FIG. 11A shows a hover input pattern 1110 and a finger input pattern 1120 detected by the controller 110, and the controller 110 calculates a distance between positions of the hover input pattern 1110 and the finger input pattern 1120. The position of each of the patterns 1110 and 1120 are recorded using a center coordinate and an edge coordinate for example. A center coordinate of each of the patterns 1110 and 1120 is indicates position of each of the patterns 1110 and 1120. Alternatively, for example, when coordinates of the patterns 1110 and 1120 correspond to objects such as an icon or a touch key on the screen, the positions of the patterns 1110 and 1120 are determined by fixed coordinates of the objects such as center coordinates of the objects. The finger input pattern 1120 may be generated by a touch between the palm and the touch screen during a process in which the user attempts to perform a stylus input. The distance D1 between the positions of the hover input pattern 1110 and the finger input pattern 1120 has a value larger than 30 mm.

FIG. 11B shows a hover input pattern 1112 and a finger input pattern 1122 detected by the controller 110, and the controller 110 calculates a distance D2 between pattern 1112 and pattern 1122 positions. The finger input pattern 1122 is generated by a touch between the palm and the touch screen 190 in a state where the user grasps the stylus, for example. In this case, the distance D2 between the positions of the hover input pattern 1112 and the finger input pattern 1122 has a value equal to or smaller than 30 mm.

FIG. 11C shows a hover input pattern 1114 and finger input patterns 1124 and 1126 detected by the controller 110, and the controller 110 calculates a distance D3 between positions of the hover input pattern 1114 and the first finger input pattern 1124 and a distance D4 between pattern 1114 and pattern 1126 positions. In this example, the finger input patterns 1124 and 1126 may be generated by a touch between two fingers (for example, a thumb and a middle finger) and the touch screen 190 is in a state where the user grasps a stylus. In this case, the distance D3 between the positions of the hover input pattern 1114 and the first finger input pattern 1124 has a value equal to or smaller than 30 mm, and the distance D4 between the positions of the hover input pattern 1114 and the second finger input pattern 1126 generally has a value larger than 30 mm. In such a multiple-touch occurrence, the controller 110 compares the distance D3 which is shorter than the distance D4 with a threshold. Controller 110 processes or ignores the detected first finger input pattern 1124 or pattern 1126 in response to comparison of D3 and D4 with one or more respective thresholds and in response to a relative comparison of D3 and D4.

In step S1040 controller 110 compares a calculated distance with a threshold. The threshold may be experimentally determined, and may be set as, for example, a value ranging from 20 mm to 40 mm or 30 mm to 50 mm. In step S1050 controller 110 ignores the finger input when the calculated distance exceeds the threshold. For example, the finger input position may correspond to the short-cut icons 191-1, 191-2, and 191-3, the main menu icon 191-4, the home button 161*a*, the menu button 161*b*, the back button 161*c*, and a menu within an application window, or may be associated with a selection of a position within the touch screen 190. When the finger input is effective, the controller 110 performs a program operation corresponding to the finger input position. Controller 110 selects objects (application, menu, icon for example), executes objects and selects positions for example. When the finger input is ignored, the controller 110 does not perform the program operation corresponding to the finger input position but may indicate occurrence of the finger input for the user (for example, through a vibration, a sound, an indicator for example).

In step S1060 controller 110 processes the finger input when the calculated distance is within the threshold. When the finger input is effective, the controller 110 performs the program operation corresponding to the finger input position, by selecting objects, executing objects, selecting positions for example. In response to concurrently receiving the finger input and the stylus input, controller 110 uses the previously described method to advantageously derive the intention of the user and processes the finger input in accordance with this intention.

The apparatuses and methods of the disclosure can be implemented in hardware, and in part as firmware or as software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware circuitry in the claimed disclosure. Under the broadest reasonable interpretation, the appended claims constitute statutory subject matter in compliance with 35 U.S.C. §101 and do not constitute software per se.

It may be appreciated that the embodiments of the present invention can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention. Therefore, embodiments of the present invention provide a program including codes for implementing a system or method claimed in any claim of the accompanying claims and a machine-readable device for storing such a program. Further, this program may be electronically conveyed through any medium such as a communication signal transferred via a wired or wireless connection, and embodiments of the present invention appropriately include equivalents thereto.

Further, the portable terminal can receive the program from a program providing apparatus connected to the portable terminal wirelessly or through a wire and store the received program. The program providing apparatus may include a memory for storing a program containing instructions for allowing the portable terminal to perform a preset content protecting method and information required for the content protecting method, a communication unit for performing wired or wireless communication with the portable terminal, and a controller for transmitting the corresponding program to the portable terminal in response to a request of the portable terminal or automatically.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of processing a touch input by a portable terminal, the method comprising:
   detecting a hover input of a stylus physically separated from a touch screen of the portable terminal without physical contact with the touch screen;
   detecting a first touch input of a user's finger concurrent with the hover input, the finger being in physical contact with the touch screen;
   calculating a first distance between positions of the hover input and the first touch input;
   detecting a second touch input of the user's finger concurrent with the hover input, the finger being in physical contact with the touch screen;
   calculating a second distance between positions of the hover input and the second touch input;
   selecting a distance from the first distance and the second distance by comparing the first distance and the second distance;
   comparing the selected distance with a predetermined threshold; and
   performing one of:
   (a) ignoring at least one of the first touch input and the second touch input in response to detecting the selected distance exceeds the threshold, and
   (b) processing at least one of the first touch input and the second touch input, in response to detecting the selected distance is within the threshold.

2. The method of claim 1, further including selecting and executing an object corresponding to at least one of the first touch input and the second touch input.

3. The method of claim 1, wherein the selected distance is a length between the hover input and one of the first touch input and the second touch input.

4. A non-transitory machine-readable storage medium embodied with program instructions for causing a processor to execute a method in a device, the method comprising:
   detecting a hover input of a stylus physically separated from a touch screen of the device without physical contact with the touch screen;
   detecting a first touch input of a user's finger concurrent with the hover input, the finger being in physical contact with the touch screen;
   calculating a first distance between positions of the hover input and the first touch input;
   detecting a second touch input of the user's finger concurrent with the hover input, the finger being in physical contact with the touch screen;
   calculating a second distance between positions of the hover input and the second touch input;
   selecting a distance from the first distance and the second distance by comparing the first distance and the second distance;
   comparing the selected distance with a predetermined threshold; and
   performing one of:
   (a) ignoring at least one of the first touch input and the second touch input in response to detecting the selected distance exceeds the threshold, and
   (b) processing at least one of the first touch input and the second touch input, in response to detecting the selected distance is within the threshold.

5. A portable terminal comprising a non-transitory machine-readable storage medium embodied with program instructions for causing a processor to execute a method in a device, the method comprising:

detecting a hover input of a stylus physically separated from a touch screen of the device without physical contact with the touch screen;

detecting a first touch input of a user's finger concurrent with the hover input, the finger being in physical contact with the touch screen;

calculating a first distance between positions of the hover input and the first touch input;

detecting a second touch input of the user's finger concurrent with the hover input, the finger being in physical contact with the touch screen;

calculating a second distance between positions of the hover input and the second touch input;

selecting a distance from the first distance and the second distance by comparing the first distance and the second distance;

comparing the selected distance with a predetermined threshold; and performing one of:
(a) ignoring at least one of the first touch input and the second touch input in response to detecting the selected distance exceeds the threshold, and
(b) processing at least one of the first touch input and the second touch input, in response to detecting the selected distance is within the threshold.

6. A portable terminal for processing a touch input, the portable terminal comprising:

a touch screen configured to display input data and detect a hover input concurrent with a first touch input and a second touch input of a user's fingers being in physical contact with the touch screen, said hover input comprising at least one input of a stylus physically separated from the touch screen without physical contact with the touch screen; and a controller configured to:

calculate a first distance between positions of the hover input and the first touch input in response to detection of the first touch input concurrent with the hover input;

calculate a second distance between positions of the hover input and the second touch input in response to detection of the second touch input concurrent with the hover input;

selecting a distance from the first distance and the second distance by comparing the first distance and the second distance;

compare the selected distance with a predetermined threshold; and perform one of: (a) ignoring at least one of the first touch input and the second touch input in response to detecting the selected distance exceeds the threshold, and (b) processing at least one of the first touch input and the second touch input, in response to detecting the selected distance is within the threshold.

7. The portable terminal of claim 6, wherein the controller is configured to select and execute an object corresponding to at least one of the first touch input and the second touch input.

* * * * *